United States Patent [19]

Blaeser et al.

[11] Patent Number: 5,187,625

[45] Date of Patent: Feb. 16, 1993

[54] LAMINATED LOAD BEAM

[75] Inventors: David J. Blaeser; Raymond R. Wolter, both of Hutchinson, Minn.

[73] Assignee: Hutchinson Technology Incorporated, Hutchinson, Minn.

[21] Appl. No.: 644,336

[22] Filed: Jan. 22, 1991

[51] Int. Cl.$^5$ .................. G11B 5/596; G11B 5/54; G11B 21/12; G11B 21/22

[52] U.S. Cl. .................................... 360/104; 360/105

[58] Field of Search .................... 360/104, 105, 103

[56] References Cited

U.S. PATENT DOCUMENTS

| | | | |
|---|---|---|---|
| 3,713,121 | 1/1973 | Fasano et al. ............... | 340/174.1 E |
| 3,984,873 | 10/1976 | Pejcha ........................... | 360/105 |
| 4,734,805 | 3/1988 | Yamada et al. ............. | 360/104 |
| 4,760,478 | 7/1988 | Pal et al. ..................... | 360/104 |
| 4,819,094 | 4/1989 | Oberg ........................... | 360/104 |
| 4,903,156 | 2/1990 | Hayashi et al. ............. | 360/104 |
| 4,905,111 | 2/1990 | Tuma et al. ................. | 360/126 |
| 4,949,194 | 8/1990 | MacPherson et al. ...... | 360/104 |
| 4,996,623 | 2/1991 | Erpelding et al. .......... | 360/104 |

OTHER PUBLICATIONS

Norwood, R. E., Damped Head Arm, IBM Technical Disclosure Bulletin, vol. 21, No. 8, Jan 1979.
Rynders, et al., Damped Slider Mount, IBM Technical Disclosure Bulletin, vol. 11, No. 3, Aug. 1968.

Primary Examiner—Robert S. Tupper
Attorney, Agent, or Firm—Faegre & Benson

[57] ABSTRACT

A head suspension assembly for use with drives for rigid disks which incorporates a layer of damping material throughout the entire structure of the suspension to reduce the amplitude of all resonant modes of vibration.

16 Claims, 5 Drawing Sheets

Fig. 1

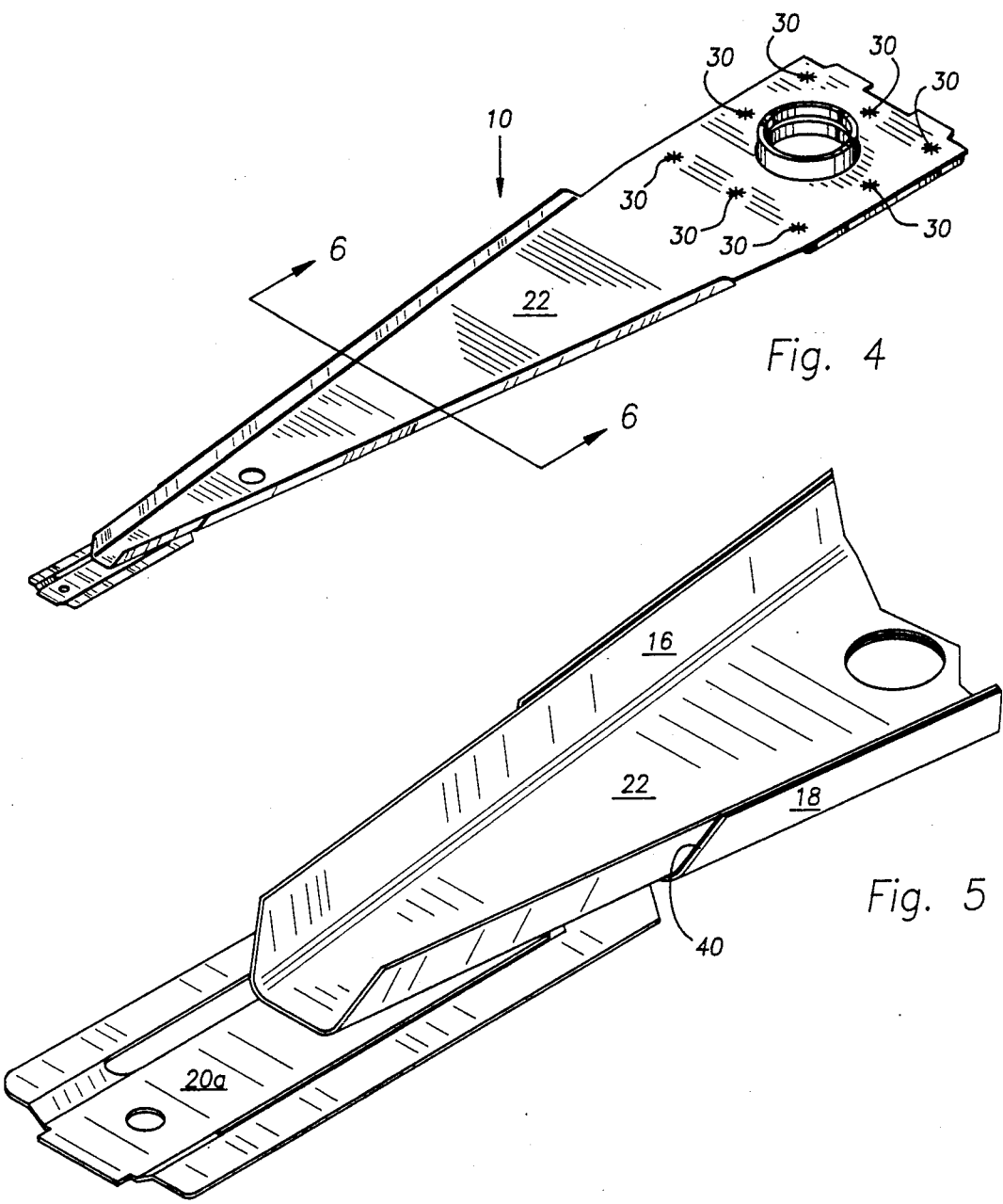
Fig. 4
Fig. 5
Fig. 6

LAMINATED LOAD BEAM

BACKGROUND OF INVENTION

The present invention is an improved magnetic head suspension assembly (HSA) for use with dynamic magnetic storage devices or drives with rigid disks. The HSA is a component within the disk drive which positions a magnetic read/write head over the desired position on the storage media where information is to be retrieved or transferred.

With the advent of more powerful computers and the rapid growth in the personal computer market it has become increasingly more important to enable the user to access data from storage devices with increased speed and accuracy.

Because there is a need to reduce access times to enable rapid retrieval of data it has become increasingly more important to reduce undesirable levels of vibration of components within the rigid disk drive. Vibration of drive components can cause instability of the drive's servo system. It also may delay the transfer of data because the data can not be confidently transferred until the amplitude of the vibration has substantially decayed. The current invention solves this problem by substantially decreasing the amplitude of all modes of vibration of the HSA.

BRIEF DESCRIPTION OF THE INVENTION

A suspension assembly in accordance with this invention incorporates a layer of damping material throughout the entire structure of the suspension. This invention shows a significant performance advantage over current suspension designs. The amplitude of all resonant modes of vibration are significantly reduced due to the large surface area for shear energy absorption to occur. To effectively reduce the amplitude of vibration of a structure it is desirable to place a damper at the point of maximum strain energy. The point on the structure at which maximum strain energy occurs may change for each mode of vibration. This invention solves this problem by distributing the damper throughout the entire structure.

Use of a damping material such as a plastic or a distributed viscoelastic material layered between two sandwiched sheets of metal allows elimination of the portion of the HSA commonly referred to as the T-flexure by incorporating it into the bottom layer of load beam. This has the benefit of reducing stack up tolerances by eliminating an additional component and may reduce static attitude and warping concerns.

Another embodiment of this invention allows the top layer of the load beam to be extended to be used as a dynamic head lifter.

BRIEF DESCRIPTION OF DRAWINGS

The detailed description of the invention including its preferred embodiments are hereinafter described with specific reference being made to the drawings in which:

FIG. 4 is a perspective view of another embodiment of the suspension assembly with a unitary flexure;

FIG. 5 is an enlarged view of the flexure area of FIG. 4;

FIG. 6 is a sectional view taken along section line 6 of FIG. 4;

DETAILED DESCRIPTION OF THE DRAWINGS

Figure 1:
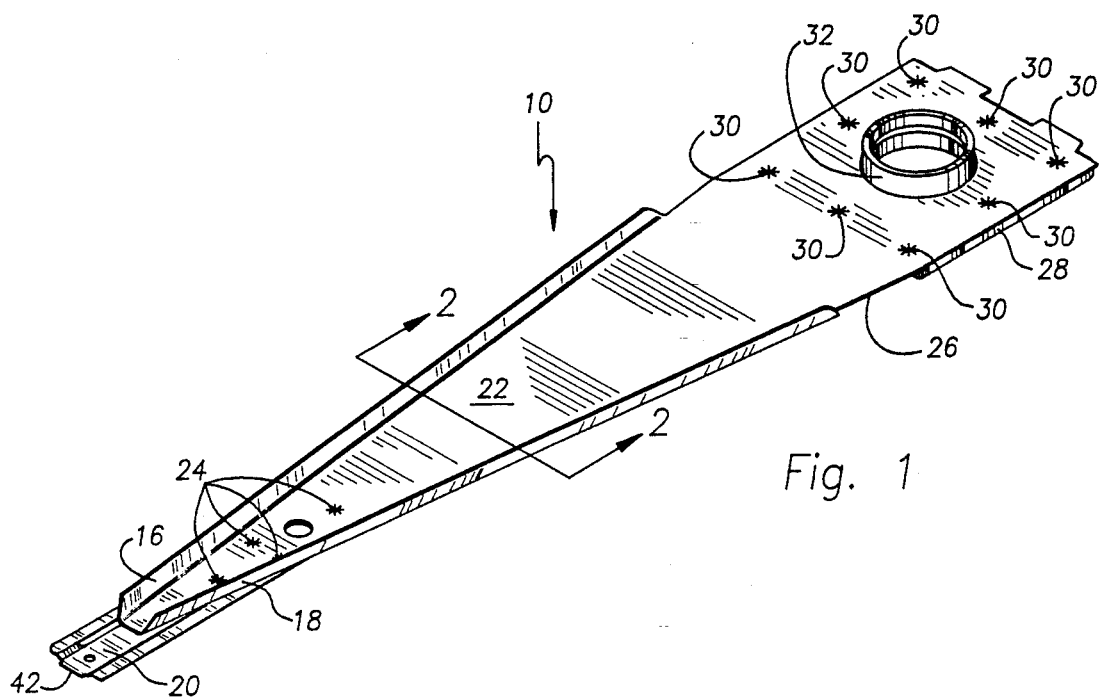
FIG. 1 is a perspective view of one embodiment of the invention showing the laminated load beam with the t-flexure and base plate attached with adhesive or welding.
Figure 2:
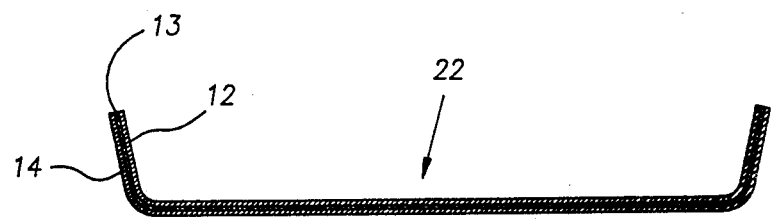
FIG. 2 is a sectional view of FIG. 1 taken along line 2.

The magnetic head suspension assembly 10 according to the present invention is shown in a first embodiment in FIGS. 1 and 2. As distinguished from prior art structures generally in use, the load beam is constructed from three layers rather than the typical single layer of sheet material. The top layer 12 and bottom layer 14 of sheet material are, in the preferred embodiment, formed from stainless steel sheet material having a nominal thickness of 0.001 inches. Sandwiched between layers 12 and 14 is a damping layer 13 which may, in a preferred embodiment be a viscoelastic core layer comprised of a suitable viscoelastic material having a nominal thickness of 0.001 inches. A suitable viscoelastic material may preferably be selected from the family of Scotchdamp brand SJ2015X viscoelastic polymers available from 3M Corporation in St Paul, Minn. A particular polymer which has been found to work well in the embodiment of the invention shown in FIGS. 1 and 2 is identified as 3M model number ISD 110.

These three layers 12, 13, and 14 make up the entire load beam. Undesirable levels of energy which excite resonant modes of vibration of this system are absorbed and dissipated as heat by damping layer 13 due to shear energy absorption.

The sandwich of top layer 12, the layer of viscoelastic material 13 and bottom layer 14 can be made by a number of possible methods. A preferred method involves the application of a one mil layer of damping material such as viscoelastic material 13 on to a one mil thick metal layer in sheet metal form and then applying another one mil thick metal above the damping material layer 13 so that layer 13 is sandwiched between the two metal layers 12 and 14. The three layered sheet is laminated by application of pressure to top and bottom layers 12 and 14. The viscoelastic material 13 need not be heated to bond the two metal layers together.

The laminated three layered sheet sandwich is then preferably etched to form individual load beams. A standard forming process bends stiffening side rails 16 and 18 to the configuration illustrated in the embodiment shown in FIG. 1. A flexure 20 is welded to the distal end of spring load beam element 22 by a series of welds 24. Other than the use of the sandwiched sheet material to form the magnetic head suspension 10, the device shown in FIGS. 1 and 2 is in other material respects similar in its overall appearance to prior art magnetic head suspensions.

The load beam element portion 22 of suspension 10 is stiffened in the area between rails 16 and 18 and is relatively springy in the area indicated by reference character 26 between the stiffened portion and the proximal end where it is welded to a base plate 28 by a series of welds 30. The head suspension is mounted on the actuator arm in the disc drive assembly utilizing a swaging technique to engage swaging boss 32 to lock the head suspension in place relative to the actuator arm utilizing conventional swaging technology. The specific means of attaching the suspension to the actuator is not an essential feature of the invention and other attachment means such as bolts or adhesives may also be used.

Figure 3:
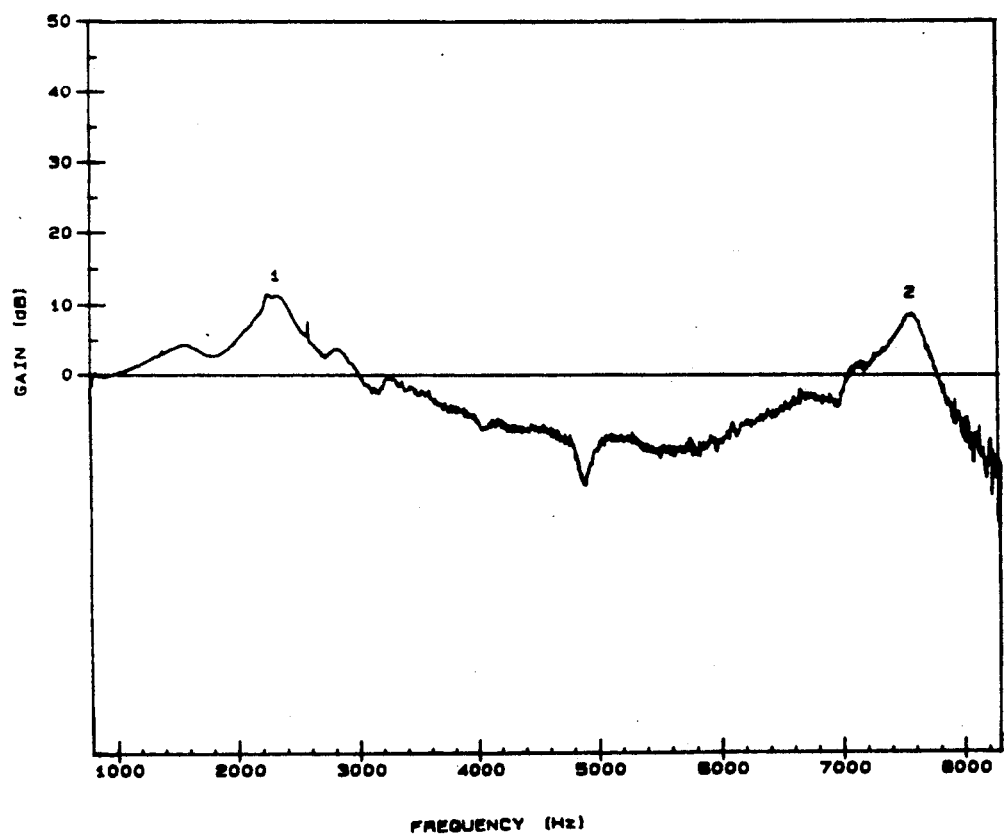
FIG. 3 is a frequency response plot representative of the damping achieved with a part corresponding to the embodiment of FIGS. 1-2.

FIG. 3 is a graphic representation of the frequency response or transfer function of the preferred embodiment of the suspension assembly as shown in FIGS. 1 and 2. The data was obtained from a suspension which was formed about its axis to have a spring force of 6.5 grams. Although the load beam suspension shown in FIGS. 1 and 2 has approximately the same appearance as the prior art structures, it does significantly reduce all modes of vibration for the load beam assembly. The resonant points of the structure all have significantly reduced gain, a considerable improvement over prior art structures.

In the second embodiment as shown in FIGS. 4, 5 and 6, the top and bottom layers 12 and 14 are also made from one mil thick stainless steel sandwiching a one mil thick layer of damping material 13. The important difference between the structure shown in FIGS. 4 through 6 and that shown in FIGS. 1 and 2 is the fact that the flexure 20a is unitary with the bottom layer 14 of sheet material. By forming the flexure as a unitary part of the load beam 22, the difficulties involving the build up of alignment tolerances as the flexure is attached to the load beam are eliminated.

The embodiment of the magnetic head suspension assembly shown in FIGS. 4 through 6 is assembled somewhat differently than the first embodiment shown in FIGS. 1 and 2. The basic assembly is accomplished by etching or stamping the top 12 and bottom 14 layers of stainless steel separately. The flexure on bottom layer 14 is also etched or stamped. The core 13 is preferably applied to the bottom layer 14 as viscoelastic material in either spray or tape form. The top layer 12 is then placed on the opposite side of core layer 13 so that the core is positioned and sandwiched between the top and bottom layers 12 and 14 respectively. Pressure is then applied to the sandwich of the three layers 12, 13 and 14 and a forming press is used to bend the side rails 16 and 18 and to apply a form to the three layer load beam as well. Depending upon the thickness and the characteristics of the sheet materials of layers 12 and 14, it may be necessary in some cases to form side rails 16 and 18 before performing the lamination step on layers 12, 13 and 14.

The rails 16 and 18 have a taper 40 at their proximal end which facilitates the forming of the flexure 20a at the distal end of the bottom layer of sheet material 14 prior to the carrying out of the lamination step.

As shown in FIG. 4, the base plate 28 is welded to the proximal end of the load beam with welds 30. It alternatively may be adhesively attached to the load beam structure.

Figure 7:
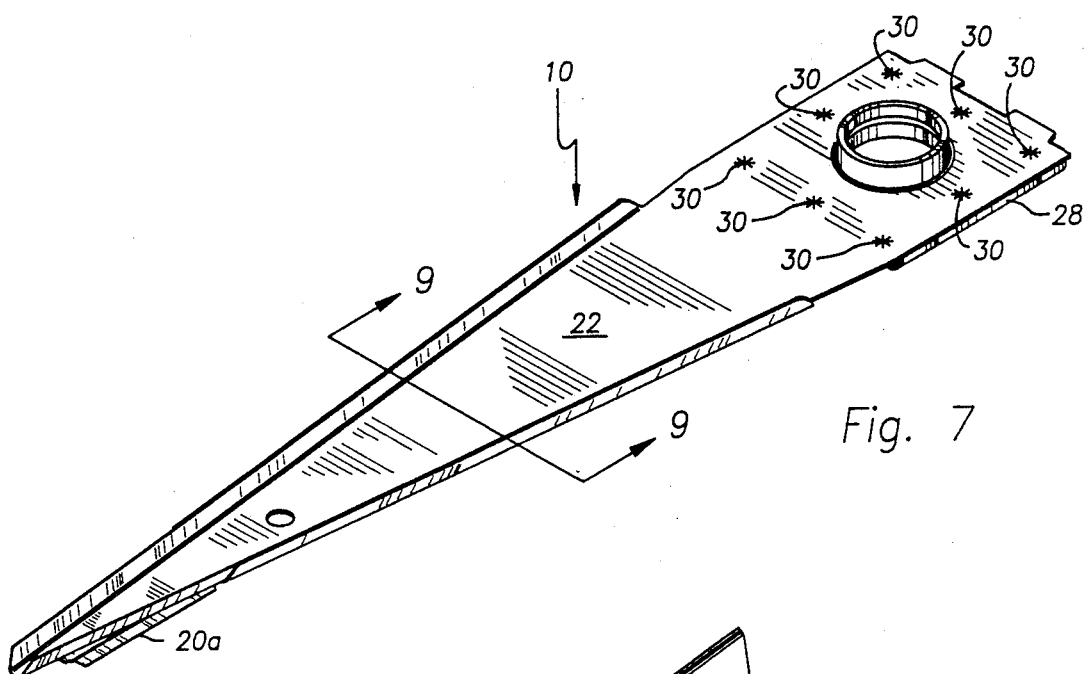
FIG. 7 is a perspective view of a further embodiment of the suspension assembly.
Figure 8:
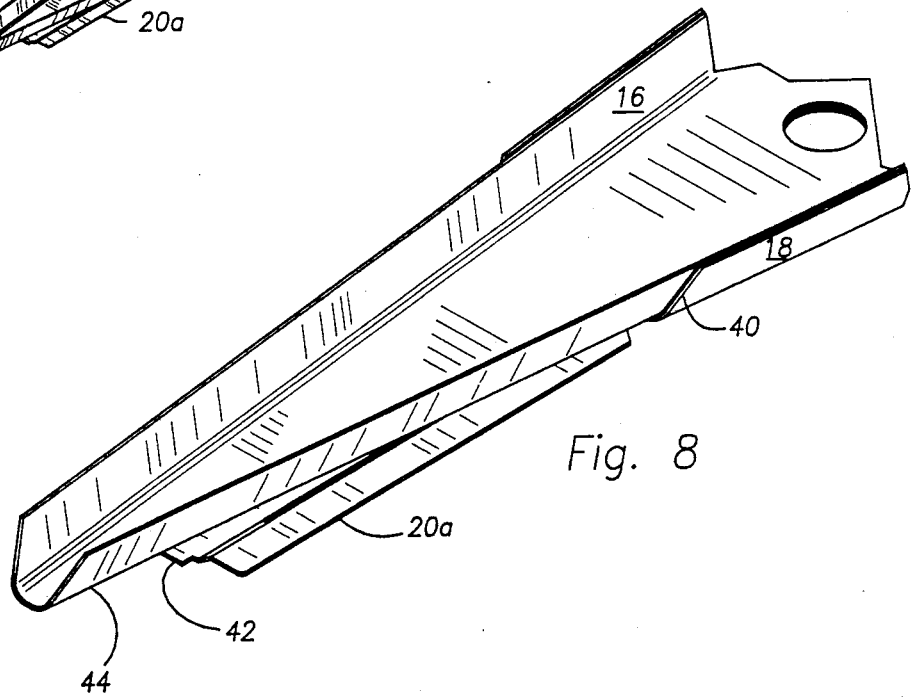
FIG. 8 is an enlarged view of the t-flexure area of FIG. 7.
Figure 9:
FIG. 9 is a sectional view taken along line 9 of FIG. 7.

A third embodiment of the load beam is shown in FIGS. 7, 8 and 9. In that embodiment, the three layers 12, 13 and 14 are formed of the same materials and have the same thicknesses as in the first two embodiments. As was the case with the embodiment shown in FIGS. 4, 5 and 6, the flexure 20a is a unitary structure with the bottom layer of sheet material 14. Again, side rails 16 and 18 have a taper 40 so that the side rails can be formed without damage to flexure 20a. As distinguished from the two embodiments of the suspension discussed above, the top layer 12 of the embodiment shown in FIGS. 7, 8 and 9 has a distal end portion 44 which extends outwardly beyond the distal end 42 of flexure 20a to provide a surface which may be engaged by a head-lifting mechanism which is not shown.

The manufacture and assembly of the suspension assembly embodiment shown in FIGS. 7 through 9 is essentially the same as was utilized for the assembly of the structure shown in FIGS. 4 through 6.

Figure 10:
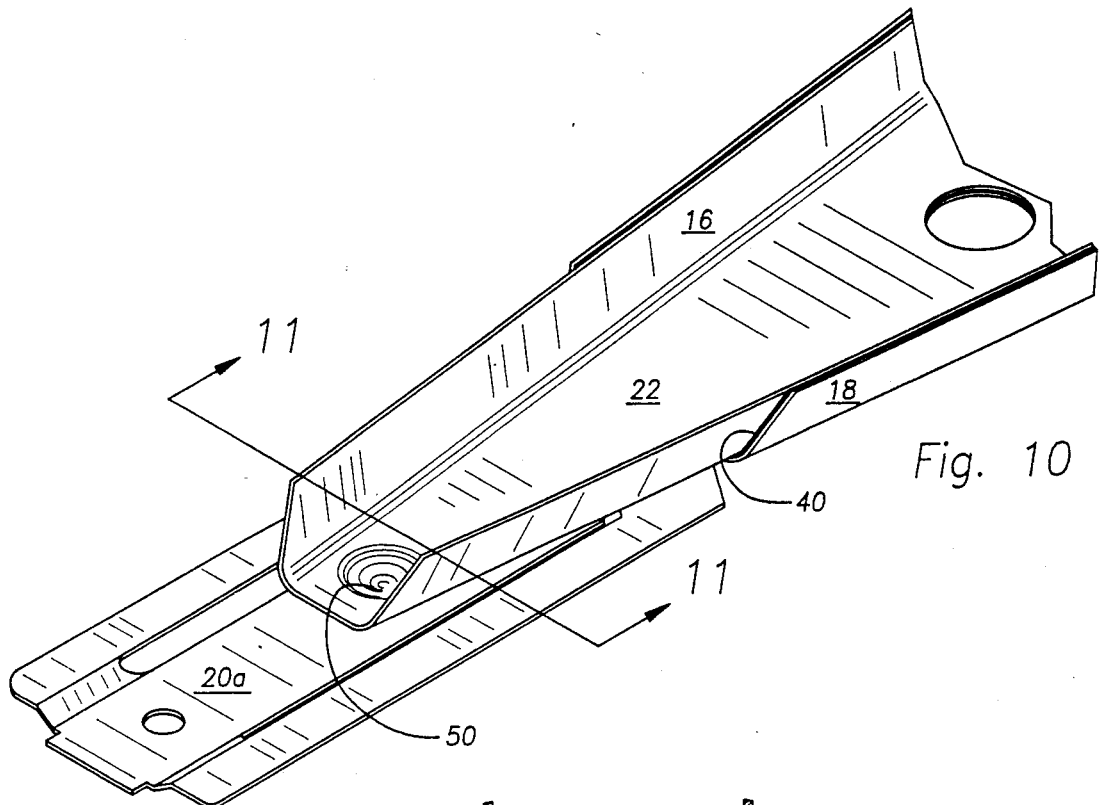
FIG. 10 is an enlarged perspective view of another embodiment of the flexure area of a load beam otherwise similar to the embodiment shown in FIG. 4.
Figure 11:
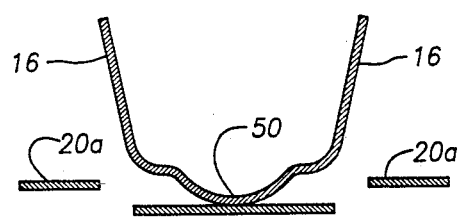
FIG. 11 is a sectional view of FIG. 10 taken along the line 11.

In FIGS. 10 and 11, a further embodiment of the invention is illustrated. In this embodiment, a dimple 50 has been formed in the distal portion of the top layer 12 of the load beam to properly load the tongue portion of the flexure used to support the magnetic read head, so that it will facilitate the multiple axis gimballing of the head when the suspension assembly is installed in a disk drive.

Figure 12:
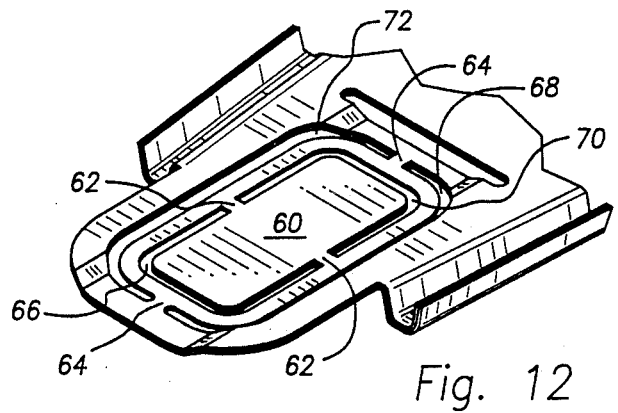
FIG. 12 is a fragmentary view of the extreme distal end of another embodiment of the load beam with an integral flexure.

In FIG. 12 a still further embodiment is illustrated wherein a head support means of the flexure is supported by arms 62 and 64 which are defined by slots 66, 68, 70 and 72 etched through the surface of the flexure portion to define a perimeter of the head support means. As can be seen, each of the arms generally encloses at least a portion of the perimeter of the head support means. The flexible arms flexibly suspend the head support means for gimballed movement. Although FIG. 12 illustrates an embodiment where all three layers of the load beam are etched to form the flexure portion, alternative embodiments can be constructed where either the top or bottom layers of the sheet material are extended and etched to form the flexure means.

In considering this invention, it must be remembered that the disclosure is illustrative only in that the scope of the invention is to be determined by the appended claims.

We claim:

1. A magnetic head suspension for attachment to a rigid arm, said head suspension comprising, in combination:

(a) a spring load beam element adapted for joining to the arm at a proximal end thereof, said load beam element comprised of a core of damping material sandwiched between a continuous top layer and a continuous bottom layer of sheet material, so that the damping material is continuous and integral with the entire spring load beam; and (b) flexure attached to and projecting beyond a distal apex of the load beam element.

2. The invention of claim 1 wherein the core separates the top layer and the bottom layer of sheet material of the load beam element.

3. The invention of claim 1 wherein the top layer and the bottom layer of sheet material in the load beam are stainless steel having a nominal thickness of 0.001 inches.

4. The invention of claim 3 wherein the core of damping material has a nominal thickness of 0.001 inches.

5. The invention of claim 1 wherein the core of damping material is a viscoelastic polymer material.

6. A magnetic head suspension for attachment to a rigid arm, said head suspension comprising, in combination:
   (a) a spring load beam element portion adapted for joining to the arm at a proximal end thereof, said load beam element comprised of a core of damping material sandwiched between a continuous top layer and a continuous bottom layer of sheet material, so that the damping material is continuous and integral with the entire spring load beam; and
   (b) a flexure portion unitary with either the top layer or the bottom layer of sheet material and projecting beyond a distal end of the load beam element portion.

7. The invention of claim 6 wherein, when the flexure portion is unitary with the bottom layer, the top layer of the sheet material of the load beam element projects beyond the flexure to provide a dynamic head lifter to facilitate use of the head suspension in disc drives where the heads are intended to be displaced from a surface of a media when parked.

8. The invention of claim 6 wherein the top layer of the sheet material of the load beam element projects over at least a portion of the flexure and the projecting layer is formed with a dimple, a projecting surface of which impinges upon the flexure portion thereby to facilitate multiple axis gimballing the flexure.

9. The invention of claim 6 wherein the flexure portion is etched out of three layers of sheet material, the flexure portion being divided into
   head support means constructed and arranged for receiving a disk drive head to be bonded thereto; and
   at least two flexible arms defined by slots in a surface of the flexure portion, said slots also defining a perimeter of the head support means, each of the arms generally enclosing at least a portion of the perimeter of the head support means, each of the flexible arms being constructed and arranged for flexible suspension of the head support means.

10. The invention of claim 6 wherein the load beam element has projection flanges oriented to project toward a surface of a magnetic media.

11. The invention of claim 7 wherein a top surface of sheet material in the load beam element is formed with flanges oriented upwardly away from a surface of a magnetic media and a bottom surface of the sheet material in the load beam element is formed with flanges oriented downwardly and towards the surface of the magnetic media.

12. The invention of claim 6 wherein the damping material is extended with and covers a surface of the extended top or bottom layer of the sheet material of an load beam to interpose damping material between the flexure and the load beam.

13. A magnetic head suspension for attachment to a rigid arm, said head suspension comprising, in combination:
   (a) a spring load beam element adapted for joining to the arm at a proximal end thereof, said load beam element comprised of a core of damping material sandwiched between a continuous top layer and a continuous bottom layer of sheet material, so that the damping material is continuous and integral with the entire spring load beam;
   (b) a flexure attached to and projecting beyond a distal apex of the load beam element; and
   (c) wherein one or both layers of the sheet material of the load beam element project over at least a portion of the flexure and the projecting layer or layers are formed with a dimple, the projecting surface of which impinges upon the flexure portion thereby to facilitate multiple axis gimballing of the flexure.

14. A magnetic head suspension for attachment to a rigid arm, said head suspension comprising, in combination:
   (a) a spring load beam element adapted for joining to the arm at a proximal end thereof, said load beam element comprised of a core of damping material sandwiched between a continuous top layer and a continuous bottom layer of sheet material, so that the damping material is continuous and integral with the entire spring load beam;
   (b) a flexure attached to and projecting beyond a distal apex of the load beam element; and
   (c) wherein the load beam element has projecting flanges oriented to project toward a surface of a magnetic media.

15. A magnetic head suspension for attachment to a rigid arm, said head suspension comprising, in combination:
   (a) a spring load beam element adapted for joining to the arm at a proximal end thereof, said load beam element comprised of a core of damping material sandwiched between a continuous top layer and a continuous bottom layer of sheet material, so that the damping material is continuous and integral with the entire spring load beam;
   (b) a flexure attached to and projecting beyond a distal apex of the load beam element; and
   (c) wherein a top surface of the top layer of sheet material in the load beam element is formed with flanges oriented upwardly away from a surface of a magnetic media and a bottom surface of the bottom layer of sheet material in the load beam element is formed with flanges oriented downwardly and toward the surface of the magnetic media.

16. A magnetic head suspension for attachment to a rigid arm, said head suspension comprising, in combination:
   (a) a spring load beam element adapted for joining to the arm at a proximal end thereof, said load beam element comprised of a core of damping material sandwiched between a continuous top layer and a continuous bottom layer of sheet material, so that the damping material is continuous and integral with the entire spring load beam;
   (b) a flexure attached to and projecting beyond a distal apex of the load beam element; and
   (c) wherein the damping material is extended with and covers a surface of an extended top or bottom layer of the sheet material of the load beam to interpose damping material between the flexure and the load beam.

* * * * *